(12) United States Patent
Kabatek et al.

(10) Patent No.: US 6,531,958 B2
(45) Date of Patent: Mar. 11, 2003

(54) INDICATING INSTRUMENT

(75) Inventors: Ulrich Kabatek, Babenhausen (DE);
Jürgen Leimbach, Regensburg (DE);
Lutz-Wolfgang Tiede, Lappersdorf (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/829,254

(22) Filed: Apr. 9, 2001

(65) Prior Publication Data

US 2001/0035818 A1 Nov. 1, 2001

(30) Foreign Application Priority Data

Apr. 8, 2000 (DE) ......................................... 100 17 588

(51) Int. Cl.[7] ................................................. B60Q 1/00
(52) U.S. Cl. .................... 340/425.5; 340/441; 340/936; 340/461
(58) Field of Search ............................. 340/425.5, 461, 340/441, 936, 815.45, 815.42, 815.47, 815.78, 525; 362/23, 26, 31, 32; 345/35, 39; 116/286, 288, 290

(56) References Cited

U.S. PATENT DOCUMENTS

| | | | | |
|---|---|---|---|---|
| 2,484,038 A | * | 10/1949 | Kirlin | ........................ 340/441 |
| 3,947,814 A | * | 3/1976 | Allen | ........................ 340/441 |
| 4,278,142 A | * | 7/1981 | Kono | ........................ 180/168 |
| 5,293,154 A | * | 3/1994 | Ginzel et al. | ............... 340/438 |
| 5,315,295 A | * | 5/1994 | Fujii | ......................... 340/936 |
| 5,819,198 A | * | 10/1998 | Peretz | ........................ 701/117 |
| 6,140,917 A | * | 10/2000 | Branson | ..................... 340/441 |

FOREIGN PATENT DOCUMENTS

| | | | | |
|---|---|---|---|---|
| DE | 37 01 359 | | 7/1988 | ............ G09F/9/00 |
| DE | 43 17 831 | | 7/1994 | ............ B60Q/9/00 |
| DE | 36 19 824 | | 4/1996 | ............ B60K/35/00 |
| DE | 197 31 320 | | 4/1998 | ............ G08B/7/08 |
| DE | 197 39 037 | | 3/1999 | ............ B60K/35/00 |
| GB | 2183837 | * | 6/1987 | ................ 340/551 |

* cited by examiner

Primary Examiner—Anh La
(74) Attorney, Agent, or Firm—Cohen, Pontani, Lieberman & Pavane

(57) ABSTRACT

An indicating instrument for a vehicle includes an analog indication of the current measured value and has a variable indication of a reference value. An automatic setting device indicates the reference value based on variable data that are significant for the indicated measured variable. The entire indicating instrument is rotated by the setting device so that the pointer is aligned horizontally when the current measured value agrees with the reference value.

9 Claims, 2 Drawing Sheets

INDICATING INSTRUMENT

BACKGROUND OF THE INVENTION

1. Field of the Invention

The invention relates to an indicating instrument for a vehicle having an analog indication of a currently measured value and having a variable indication of a reference value.

2. Description of the Related Art

Indicating instruments which include an analog indication of a currently measured value and a variable indication of a reference value are constructed, for example, as barometers for determining the air pressure. Barometers have a pointer which may be rotated by hand so that a user can set the pointer to the current air pressure. After some time, the user can then determine whether the air pressure has risen or fallen by comparing the current air pressure to the pointer. Tachometers for tractors may also be configured with a settable pointer. As a result, the driver may, for example, set the pointer to mark the optimum travel speed for a plough during a ploughing operation. Once the pointer is set, deviations from the optimum travel speed strike the driver more clearly than if the driver had only to note the correct speed.

In a vehicle, critical reference variables often vary with operating conditions. For example, drivers of motor vehicles know that when an internal combustion engine is still cold, the engine should be driven at a lower engine speed than when the engine is at operating temperature. However, it is not clear which maximum engine speed may actually be used during the warming-up phase of the internal combustion engine.

Furthermore, the reference speed of a tachometer or a speedometer of a motor vehicle changes very frequently while driving. For example, the reference speed is typically a maximum of 50 km/h in built-up areas and is 100 km/h on open roads. Many different reference speeds may additionally depend on different speed limitations in congested areas such as towns and cities. Therefore, upon detecting a speed limit, the driver could mark this on his speedometer by manually adjusting a reference pointer just as the reference pointer of a barometer is set. However, this would be tiresome and has the risk of being wrongly implemented in view of the very many and frequently changing speed limitations which can often not be comprehended logically.

SUMMARY OF THE INVENTION

It is an object of the present invention to construct an indicating instrument including a variable indication of a reference value such that changes in the reference value may be taken into account with minimal burden on the user.

According to the invention, the object is met by an automatic setting device for the indicator of the reference value in response to variable data which are significant for the indicated measured variable.

The indicating instrument according to the present invention includes a reference indication value which is always shown in addition to the current indication value and which varies automatically in accordance with the requirements. The indicating instrument according to the present invention allows a user to control a system or a vehicle in such a way that a reference value to be complied with in each case is observed. Since the reference value is automatically adapted to the requirements, the viewer does not need to set any reference values or to note them. The indicating instrument according to the invention may be used in various types vehicles to comply with a reference speed. For example, ships and aircraft have a fixed arrival time and an optimum speed for the fuel consumption. Railborne vehicles are subject to different reference speeds for different sections of the railroad.

The indicating instrument may comprise a revolution counter and the setting device for adjusting the reference value may operate on the basis of operating data from the internal combustion engine of the vehicle. Conventional revolution counters typically mark in red the engine speeds which must not be exceeded or may be exceeded only briefly when the internal combustion engine is operating normal at the operating temperature. However, a revolution counter according to the present invention may variably indicate a maximum speed such that the maximum value is low when the internal combustion engine is cold and rises as the internal combustion engine warms up. The variable maximum value reference ensures that the driver drives in a non-damaging way, even under unfavorable operating conditions.

A revolution counter according to the present invention is constructed particularly simply for the application in the vehicle if the setting device for adjusting the reference value operates in response to the oil temperature of the internal combustion engine in the vehicle.

In a specific embodiment of the present invention, the indicating instrument comprises a speedometer and the setting device is designed to adjust the reference value on the basis of the position of the vehicle. According to this embodiment, the driver no longer needs to pay attention to road signs such as place name signs and speed limit signs to comply with the speed limit existing in built-up areas Instead, the reference speed changes after the passing of a road sign is automatically signaled to his tachometer on the basis of his vehicle position so that the driver can very rapidly recognize whether he is too fast or unnecessarily slow on the basis of the angular difference between the speedometer pointer and the indication of the reference value.

The necessary setting commands depending on the vehicle position may be obtained very cost-effectively when the setting device is designed to adjust to the reference value in response to setting commands from a vehicle navigation system. The navigation system already includes information regarding the respective localities on the basis of stored road maps. Furthermore, the location system of the navigation system knows where the vehicle is currently located. Accordingly, the addition of a control for the indication of the reference value necessitates only minimal additional outlay when an existing navigation system is used to control the indication of the reference value.

In an alternative embodiment, the setting device is designed to adjust the reference value in response to external data transmitted wirelessly. For example, the variable speed limits which are common on freeways for controlling the traffic flow may be broadcast by radio so that the variable reference value on the indicating instrument could be controlled on the basis of such radio signals.

Even without detection of vehicle position and without radio transmission of information, the indication of the reference value could be controlled by the setting device for adjusting the reference value operating by automatic image recognition of traffic signs.

The indicating instrument of the present invention may include a manual bypass to override the automatic setting.

The driver may use this option of setting a reference value indication by manually inputting in addition to the automatic input. This embodiment is required, for example, when a heavy goods vehicle is temporarily being used with a trailer and has to comply with the speed limit prescribed for that use.

A deviation from the reference value may be easily recognized by a driver when the setting device is designed to rotate the indicating instrument into a position in which the pointer is horizontal or vertical when there is agreement between the current measured value and the reference value. Experience shows that the eye detects deviations from the horizontal or vertical particularly quickly.

To illustrate the deviation from a reference value, means for the differently colored illumination of at least of the sector between the pointer indicating the current measured value and the reference value may be provided. The color of the sector between the pointer and the reference value may be designed to depend on whether the measured value falls above or below the reference value.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 a is a schematic view of an indicating instrument according to an embodiment of the present invention;

FIG. 1b is a schematic view of another embodiment the indicating instrument of FIG. 1a;

FIG. 1c is a schematic view of another embodiment for the indicating instrument of FIG. 1a.

DETAILED DESCRIPTION OF THE PRESENTLY PREFERRED EMBODIMENTS

Figure 1A:
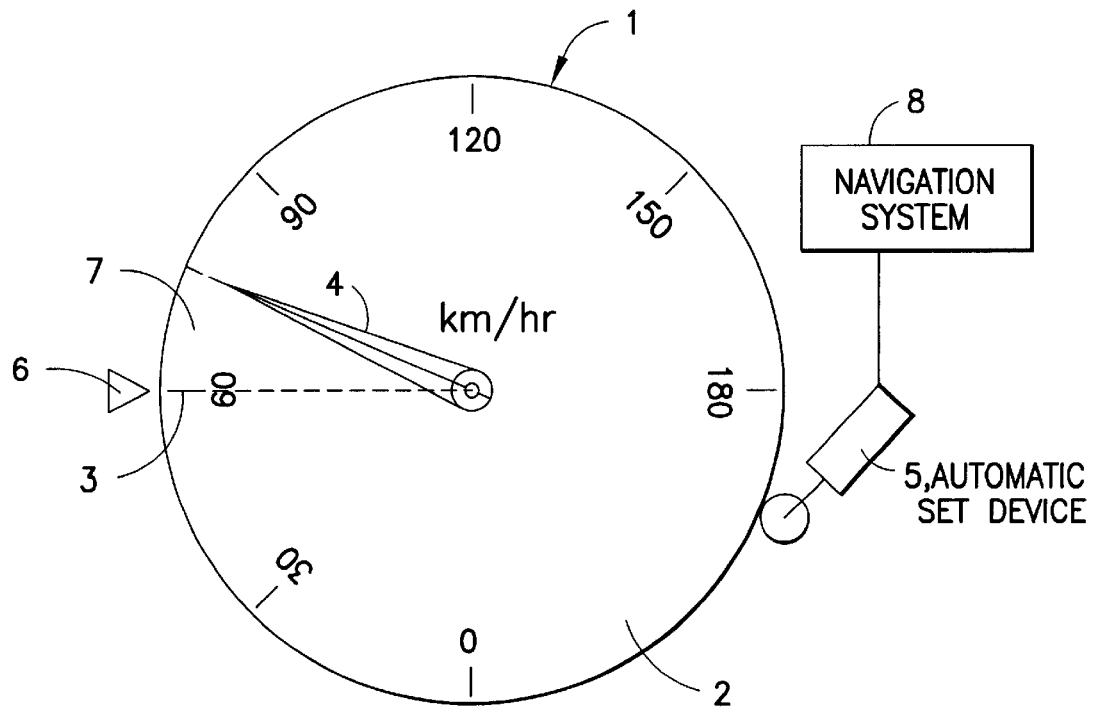

FIG. 1a shows an indicating instrument 1 designed as a speedometer with a scale 2 having speed markings 3. A pointer 4 is movably arranged on the indicating instrument 1 for moving over the scale 2 and indicating the respectively measured speed on the scale 2. An automatic setting device 5 is operatively arranged for rotating the entire indicating instrument 1 to a position in which a reference value on the scale 2 is aligned horizontally with a reference marking 6. In the example depicted in the drawing, the vehicle in which the indicating instrument 1 is installed is about to travel through a region in which the permitted maximum speed is 60 km/h. The pointer 4 is aligned at a position differing from the horizontal indicating to the driver at a glance that the vehicle is travelling at a higher speed than allowed. The sector 7 comprising the deviation of the pointer 4 from the reference marking 6 may be highlighted by a differently colored illumination depending on whether the measured value falls above or below the reference value.

If, for example, the vehicle in which the indicating instrument 1 is installed travels onto a freeway on which the speed is restricted to 120 km/h, a navigation system 8 of the vehicle recognizes that the vehicle is on a road having a different speed limit. The setting device 5 rotates the entire indicating instrument 1 through 105° in the counter-clockwise direction until the 120 km/h marking is then aligned horizontally in response to the navigation system 8 which indicates the change in speed limit.

Figure 1B:
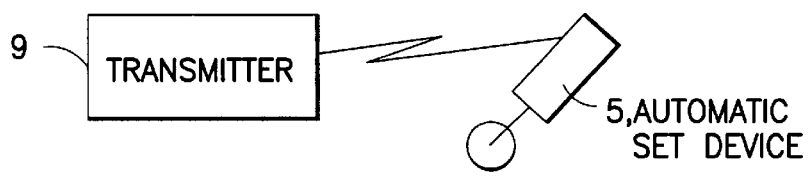

FIG. 1b shows a further embodiment in which the setting device 5 rotates the indicating instrument 1 in response to a radio signal transmitted from a transmitter 9 to communicate the correct speed limit to the setting device 5.

Figure 1C:
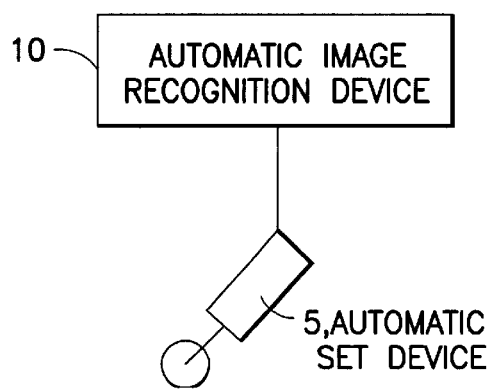

FIG. 1c shows yet a further embodiment in which the setting device 5 rotates the indicating instrument 1 in response to an automatic image recognition device 10 which recognizes traffic signs.

Figure 2:
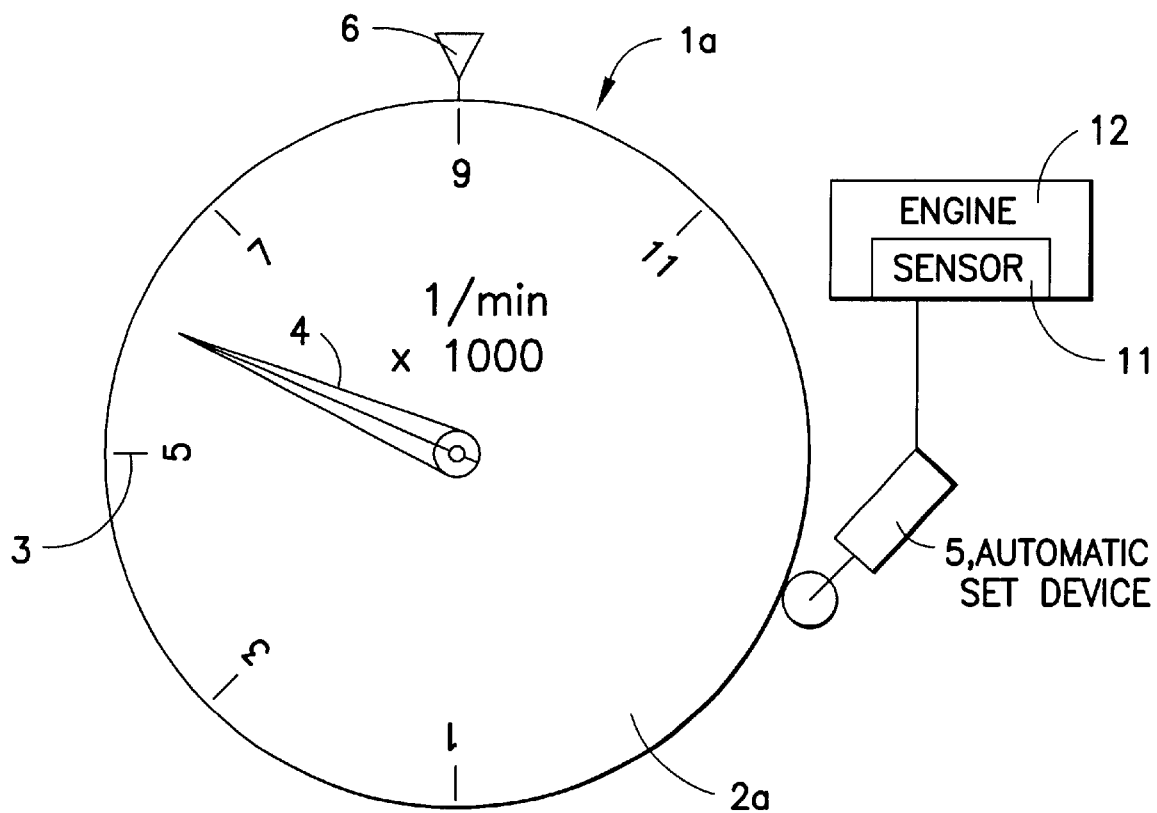
FIG. 2 is a schematic view of an indicating instrument according to another embodiment of the present invention.

FIG. 2 shows an embodiment of an indicating instrument 1a comprising a tachometer having a scale 2a with markings 3a. In this embodiment, the setting device 5 is connected to a sensor 11 which senses the oil temperature of an internal combustion engine 12 of the vehicle. This embodiment also shows that the pointer 4 is vertical when the measured valve agrees with the reference valve.

Of course, the present invention may also be implemented electronically such as, for example, by a tachometer or speedometer being depicted on a liquid-crystal display.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An indicating instrument for a vehicle, comprising:
    an analog indication for indicating a current measured value of a measured variable;
    a variable indication of a reference value of the measured variable; and
    a setting device including means for receiving data pertaining to the reference value of the measured variable and means for automatically setting said variable indication of the reference value in response to the data pertaining to the reference value of the measured variable, wherein said analog indication includes a pointer for indicating the current measured value and said setting device is operatively arranged for rotating said indicating instrument into a position in which said pointer points in one of a horizontal direction and a vertical direction when the current measured value equals the reference value.

2. The indicating instrument of claim 1, wherein said indicating instrument comprises a tachometer and said data pertaining to the reference value of the measured variable includes operating data from an internal combustion engine in the vehicle.

3. The indicating instrument of claim 2, wherein said operating data comprises an oil temperature of the internal combustion engine in the vehicle.

4. The indicating instrument of claim 1, wherein said indicating instrument comprises a speedometer and wherein said data pertaining to the reference value of the measured variable includes a position of the vehicle.

5. The indicating instrument of claim 4, wherein said setting device is arrangeable for adjusting the variable indication in response to setting commands from a vehicle navigation system, wherein said setting commands are determined in response to the position of the vehicle determined by the vehicle navigation system.

6. The indicating instrument of claim 4, wherein said data pertaining to the reference value of the measured variable comprises data transmitted via a wireless transmitter.

7. The indicating instrument of claim 4, further comprising an automatic image recognition device for automatic image recognition of traffic signs, and wherein said data pertaining to the reference value of the measured variable comprises a speed limit determined by the automatic image recognition device.

8. The indicating instrument of claim 1, wherein the setting device further allows manual setting of said variable indication.

9. The indicating instrument claim 8, wherein said analog indication includes a pointer for indicating the current measured value and said indicating instrument further comprises means for the differently colored illumination at least of the sector between said pointer indicating the current measured value and the reference value, depending on whether the measured value falls above or below the reference value.

* * * * *